United States Patent [19]

Melnik et al.

[11] Patent Number: 4,899,619
[45] Date of Patent: Feb. 13, 1990

[54] MANUAL OVERRIDE FOR AN ELECTRONICALLY CONTROLLED AUTOMATIC TRANSMISSION

[75] Inventors: George Melnik, New Castle, Del.; Bruce E. Amrein, Harford County, Md.; Robert C. Brucksch, Harford, Md.; Curtis L. McCoy, Harford, Md.; James A. Martin, Lancaster, Pa.

[73] Assignee: The United States of Amerca as represented by the Secretary of the Army, Washington, D.C.

[21] Appl. No.: 239,570

[22] Filed: Aug. 31, 1988

[51] Int. Cl.⁴ .............................................. B60K 20/00
[52] U.S. Cl. .................................. 74/625; 74/473 R; 335/186
[58] Field of Search ...................... 74/625, 473 R, 335, 74/336; 335/173, 186, 187, 189, 191

[56] References Cited

U.S. PATENT DOCUMENTS

| 4,073,198 | 2/1978 | Ford | 74/625 |
| 4,095,213 | 6/1978 | Hayden | 335/186 |
| 4,351,206 | 9/1982 | Lemieux et al. | 74/752 A |
| 4,503,726 | 3/1985 | Green | 74/473 R |
| 4,628,772 | 12/1986 | Nishikawa et al. | 74/866 |

FOREIGN PATENT DOCUMENTS

| 249159 | 9/1966 | Austria | 335/186 |
| 60-234156 | 11/1985 | Japan | 74/473 R |

*Primary Examiner*—Leslie A. Braun
*Assistant Examiner*—Scott Anchell
*Attorney, Agent, or Firm*—Peter A. Taucher; David L. Kuhn

[57] ABSTRACT

Disclosed is an apparatus for manually shifting an electronically controlled automated transmission. The device includes a series of mechanical linkage elements and gear transelements connected between the solenoid-operated valves of the automatic transmission and a control lever in the driver's compartment of the vehicle. One of the mechanical linkage elements is a cam shaft whose rotational position determines which subset of the solenoid operated valves will be actuated.

9 Claims, 4 Drawing Sheets

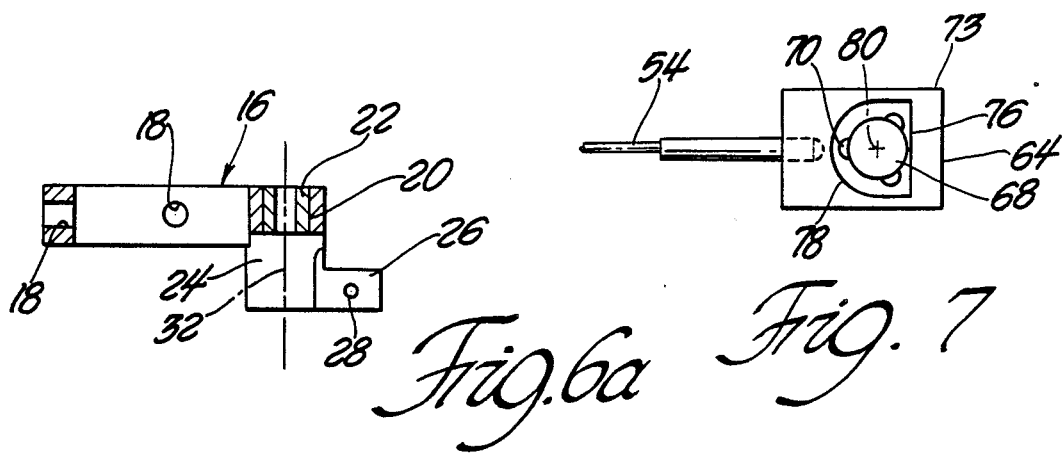
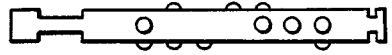
REVERSE     Fig. 8
NEUTRAL     Fig. 9
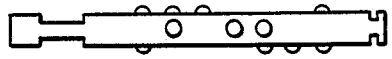
DRIVE     Fig. 10
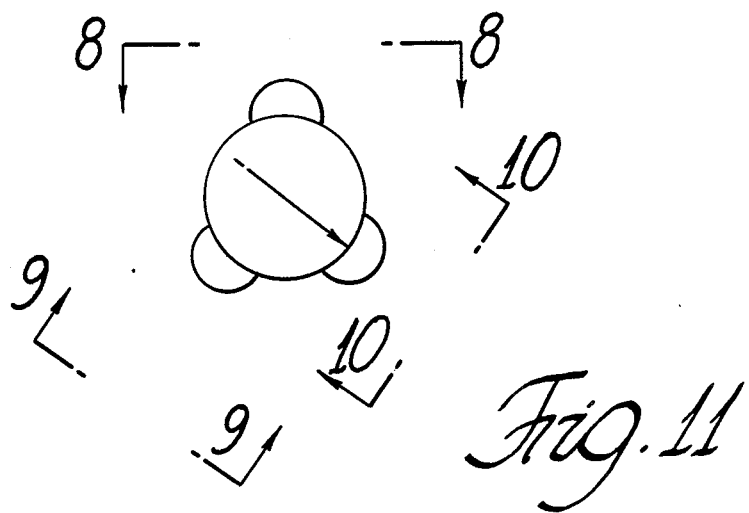

MANUAL OVERRIDE FOR AN ELECTRONICALLY CONTROLLED AUTOMATIC TRANSMISSION

GOVERNMENT INTEREST

The invention described herein may be manufactured, used, and licensed by or for the Government for governmental purposes without payment to us of any royalty thereon.

BACKGROUND AND SUMMARY

This invention relates to control mechanisms for drive trains of vehicles and more particularly relates to manual override systems for electronically controlled automatic transmissions in military vehicles such as tanks.

Presently, the U.S. Army utilizes the M1 or M1A1 tank, which has an automatic transmission electrically controlled by a transmission shift selector located in the driver's compartment and monitored by the ECU (Electronic Control Unit). Solenoid operated valves on the transmission respond to signals from the transmission shift selector to control hydraulic circuitry within the transmission, thereby effecting engagement or disengagement between clutches and gears of the transmission. It is contemplated that power to the shift selector or to the solenoid operated valves can be interrupted because of battle damage to the tank or failures such as loose electrical connections or short circuits. An existing mechanical override for automatic transmission has a plunger under an access plate on the tank for the automatic transmission. A disadvantage of the existing manual override is that the plunger can place the transmission only in drive, and can not place the transmission in reverse. To use the override plunger, a soldier must exit the tank, unbolt the access plate, remove the plate, and use a three-foot bar to push the plunger into the override position. This procedure is time consuming and exposes the soldier to enemy fire. In a battle scenario, there is a significant risk that the tank will be destroyed or its crew killed by enemy fire before the tank transmission can be placed in its mechanical override mode. Further, the tank engine cannot be shut down during this procedure and the access plate is located between engine exhaust ports from which blows an extremely hot stream of exhaust gas. Consequently, removing the access plate and actuating the override is inherently inconvenient and even dangerous for the soldier doing it.

We propose a manual or mechanical override mechanism for shifting the automatic transmission of a tank, the mechanism being operable from within the tank, thereby avoiding the problems mentioned above. Our mechanical shifting mechanism is controlled by a push-pull cable running from a gear shift lever in the driver's compartment of the tank. The cable actuates a series of mechanical links and gear train members and ultimately turns a specifically lobed cam shaft. The turning cam shaft moves selected actuator blocks, thus causing activation of solenoid valves which accomplish the range selection of the transmission. Our mechanical shifting mechanism is designed to be installed or existing automatic transmissions in M1 and M1A1 tanks without a major overhaul on their drive trains. The individual elements of the shifting mechanism are easily removed from the mechanism or from the tank to facilitate their installation or repair.

DESCRIPTION OF THE DRAWINGS

FIG. 1 also shows gear train elements which actuate the mechanical linkage elements.

FIGS. 5a and 6a are elevational views of the collar surrounding the solenoid assembly.

FIG. 7 is an additional view of a block which is one of the linkage elements in FIG. 1.

FIGS. 8 through 11 are additional views of the cam shaft, which is one of the mechanical linkage elements shown in FIG. 1.

DETAILED DESCRIPTION

Figure 1:
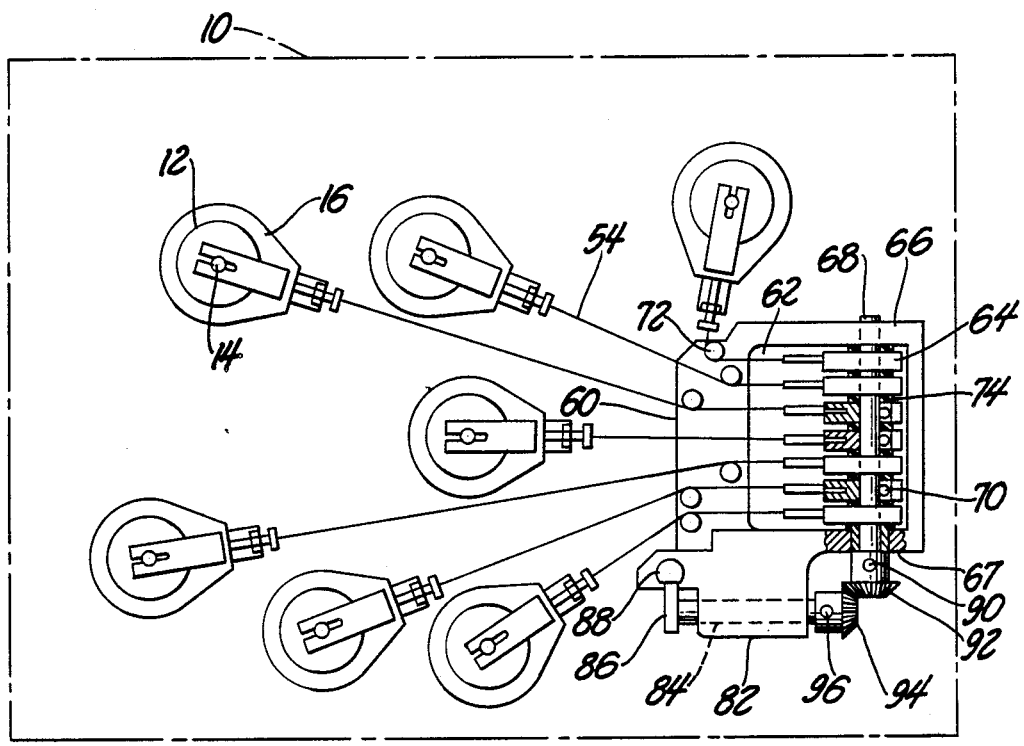
FIG. 1 is a partial cut-away plan view showing mechanical linkage elements of our shifting mechanism which actuate solenoid assemblies of the transmission.
Figure 5:
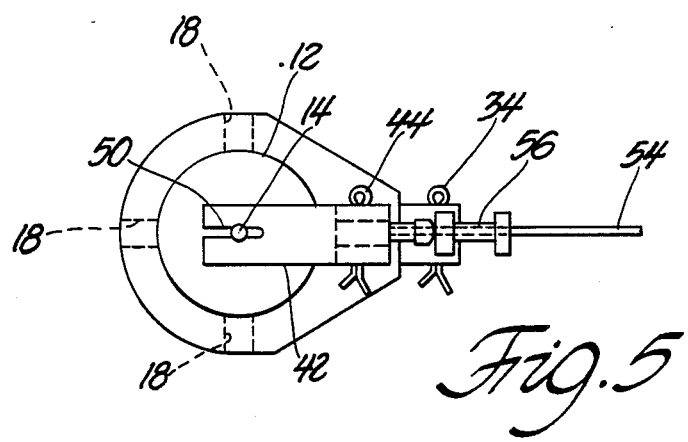
FIGS. 5 and 6 are elevational views showing details of the linkage elements which actuate the solenoid assemblies of the transmission.
Figure 6:
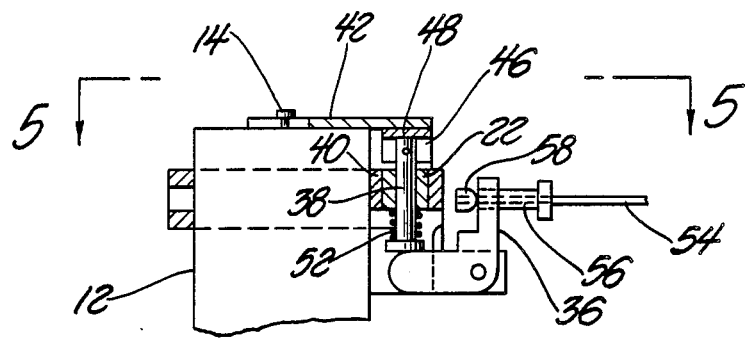

Referring to FIG. 1, the valve housing for an automatic transmission of a military vehicle such as an M1 tank is schematically represented by the rectangular box 10. Protruding from the wall of transmission valve housing 10 are several canisters 12, each containing a conventional solenoid-operated valve (not shown) having energizable solenoid coils whose solenoid plungers are translatable along the central axes of the coils. Selective actuation of selected sets of the solenoid-operated valves in response to signals from the vehicle's transmission shift selector (not shown) results in the transmission being shifted from one gear range to another. A given set of solenoids may be actuated, for example, to shift the transmission from the "reverse" gear to "neutral" gear. As seen in FIGS. 1, 5 and 6, a plunger 14 protrudes from one end of canister 12. Plunger 14 is connected to a check ball (not shown) which is seated when plunger 14 is retracted with respect to the cannister (to the coil de-energized position). Pulling the plunger outward from the cannister (to the coil energized position) removes the ball from its seat, thereby opening the solenoid-operated valve.

Figure 5A:
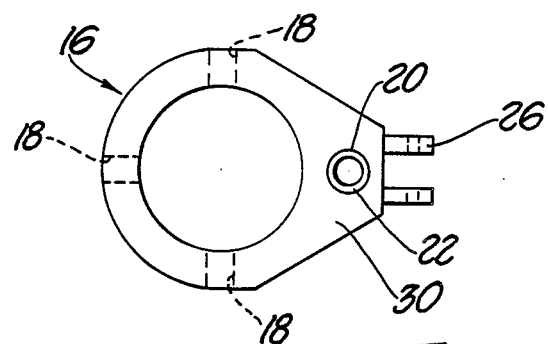

Circumscribing canister 12 is a collar 16, which is shown separately in FIGS. 5a and 6a. Collar 16 has three threaded orifices 18 aligned along collar radii for receiving set screws by which the collar is fixed in its position on canister 12. Collar 16 has a relatively radially thick sector 30 defining an orifice 20 whose center line 32 is parallel to the longitudinal axis of canister 12. Extending from sector 30 along centerline 32 is an axial projection 24 having a pair of parallel arms 26 extending away from the canister. Apertures 28 in parallel arms 26 receive a cotter pin 34 by which an L-shaped lever 36 is pivotally mounted to collar 16, as best illustrated in FIGS. 5 and 6. One leg of lever 36 engages one end of a collar pin 38 slideably translatable through liner sleeve 22 in orifice 20 of the collar. The other end of collar pin 38 is fastened to an arm 42 by means of a cotter pin 44 passing through both collar pin 38 and flanges 46 of arm 42. The other end of collar pin 38 also has affixed thereto a platelet 48 bearing against a flat surface of arm 42 between flanges 46, whereby arm 42 can not rotate with respect to collar pin 38. Arm 42 lies flat upon the end of canister 12 and has a slot 50 to receive the shank of plunger 14, slot 50 being narrower than the diameter of the head of plunger 14. Slot 50 is advantageous in that it allows arm 42 to be removed from the FIG. 6 assembly once cotter pin 44 has been removed. L-shaped lever 36, collar pin 38 and arm 42 are biased toward their FIG. 6 position by compressive coil spring 52 trained between liner sleeve 22 and a shoulder on the lever-engaging end of collar pin 38.

The assembly comprised of L-shaped lever 36, collar pin 38, and arm 42 is actuated by cable 54, which includes an adjustment screw 56 threadingly engaged with one leg of lever 36. Turning adjustment screw 56 controls the position of cable end 58 and thereby adjusts the tension of cable 54. Again, referring to FIG. 6, pulling to the right on cable 54 pivots lever 36 clockwise, thus raising collar pin 38 and arm 42. Plunger 14 is thus raised from its FIG. 6 position, which is associated with de-energized state of the solenoid in canister 12. Armature pin 14 arrives at an axially extended position relative to canister 12 which is associated with the energized state of the coil.

Referring again to FIG. 1, it can be seen that several assemblies of canisters and collars have cables 54 leading toward a mounting block 60. Mounting block 60 is preferably secured to the housing of transmission valve body 10 by bolts so that it can be removed from the transmission 10 if desired. Mounting block 60 has wall segments 66, 67 at two of its sides. Journaled through the opposed walls 66, 67 and passing through blocks 64 is a cam shaft 68 having a plurality of cam lobes 70. Spacers 74 on cam shaft prevent axial movement of blocks 64. Several posts 72 on the mounting block serve to guide cables 54 so that the ends of these cables at sliding blocks 64 are oriented normal to the rotational axis of cam shaft 68. Blocks 64 are free to rotate about camshaft 68 subject, of course, to the limits imposed by the tension of cables 54.

One of the seven blocks 64 is shown in FIG. 7, as seen along the axis of cam shaft 68. Block 64 defines a generally D-shaped aperture 78 through which passes cam shaft 68. A flat camming surface 76 is formed by a part of the inner peripheral surface of aperture 78 radially nearest centerline 80, the rest of the inner peripheral surface being far enough removed from centerline 80 so as to never engage any of cam lobes 70.

FIGS. 8 through 11 show additional views of cam shaft 68 and serve to show the spherically programmed locations of lobes 70 on cam shaft 68. Lobes 70 are arranged in lines on the outer peripheral surface of cam shaft 68 which are parallel to the centerline 80 of the cam shaft. The lobes are located only at certain axially spaced positions on cam shaft 68 which correspond to the locations of sliding blocks 64 along cam shaft 68. The number and spacing of the set of lobes in any given line are chosen to translate only selected blocks away from the centerline 80 (against the tension of cables 54) when that set of lobes cams against surface 76. FIGS. 8 through 10 show specific examples of lobe arrangements corresponding to the reverse, neutral and drive ranges of the automatic transmission. The position of cam shaft 68 and lobes 70 in FIG. 7 represent the "unlocked" position of the cam shaft wherein none of the sliding blocks 64 is translated away from centerline 80 and none of the sliding blocks exerts tension on cables 54. Cam shaft 68 is placed in this position when it is desired to prevent our invention from mechanically operating the automatic transmission 10. The camshaft/lobe assembly exhibits asymmetry relative to any plane passing through centerline 80 of cam shaft 68 and the lobes are arrayed asymmetrically relative to any place normal to centerline 80.

Referring again to FIG. 1, mounting block 60 includes an enlarged boss 82 through which extends a drive shaft 84 disposed perpendicular to cam shaft 68. At one end of drive shaft 84 is a pinion gear 86 and at the opposite end is a bevel gear 94, which meshes with bevel gear 92 on cam shaft 68. A set screw, as at 90 or 96, is used to fasten the bevel gears to their respective shafts. Loosening one of the set screws permits one of shafts 68 or 84 to be rotated without rotating the other shaft.

Figure 4:
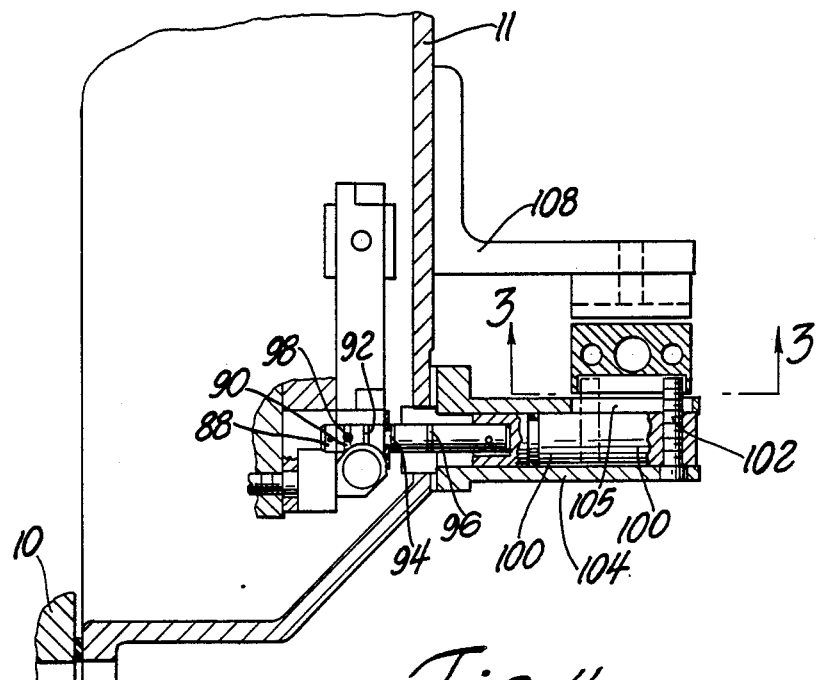
FIG. 4 is a view taken along line 4—4 in FIG. 2.

Extending perpendicularly to cam shaft 68 and drive shaft 84 in mounting block 60 is rack 88, which engages pinion gear 86, so that translation of rack 88 rotates cam shaft 68. As seen in FIG. 4, rack 88 has four grooves 88, 90, 92, and 94 capable of being engaged by a spring loaded ball detent mechanism 98 mounted in mounting block 60. When one of the grooves is translated by rack 88 into registry with ball detent mechanism 98, the ball detent mechanism enters the groove to exert a light anti-translation force on the rack. When one of the grooves is registered with the ball detent mechanism, cam shaft 68 will be in its drive, neutral, reverse or unlocked range. The ball detent mechanism and the groove thus comprises a palpable feedback means by which a person operating our shifter mechanism can feel when he has selected one of its unlock, neutral, drive or reverse modes. The feedback will accurately occur despite any slack or hysteresis in the elements connected between rack 88 and a control lever in the driver's compartment of the vehicle. For calibration purposes, the relative positions of rack 88 and cam shaft 68 can be adjusted by loosening one of set screws 90 or 96, rotating drive shaft 84 or cam shaft 68 as desired, and then retightening the set screw.

Fastened to one end of rack 88 is a piston-like member 100 having a detent pin 102 extending radially from one end. slideably receiving member 100 is a cylindrical sleeve 104 fastened at one end to housing cover 11 of the transmission. Sleeve 104 has an axially elongated slot 105 to accommodate detent pin 102 as piston-like 100 member translates.

Figure 2:
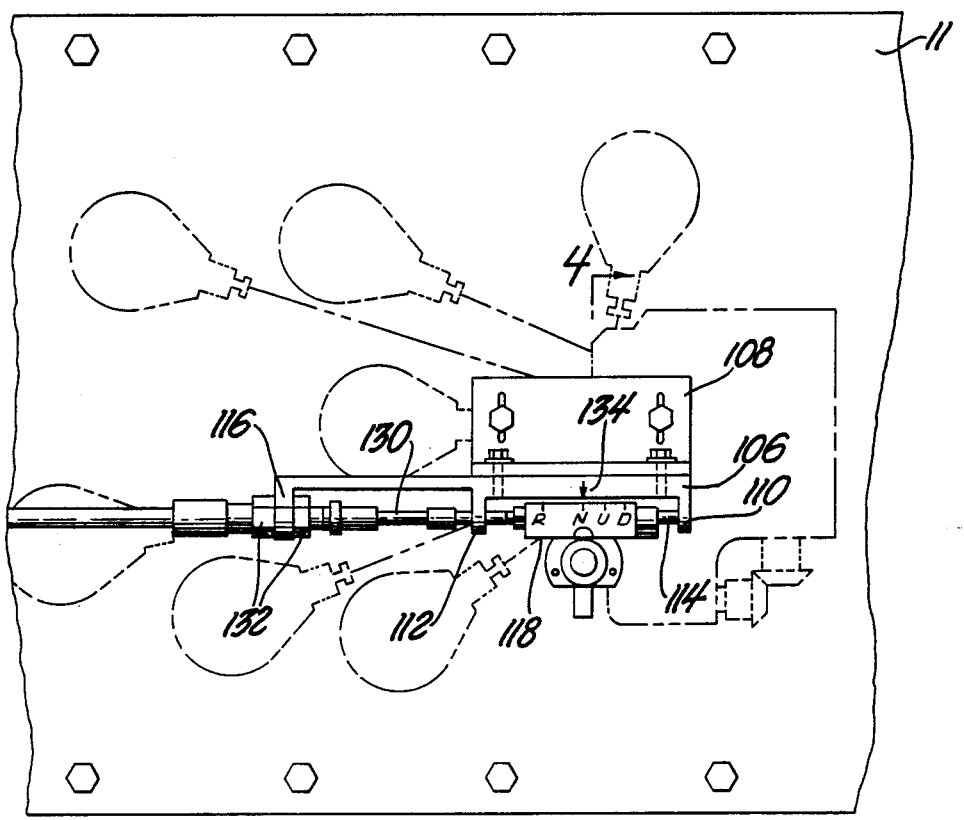
FIG. 2 is an elevational view showing additional mechanical linkage elements of our shifting mechanism which operate the gear train elements shown in FIG. 1. The FIG. 1 elements are shown in phantom lines in FIG. 2.
Figure 3:
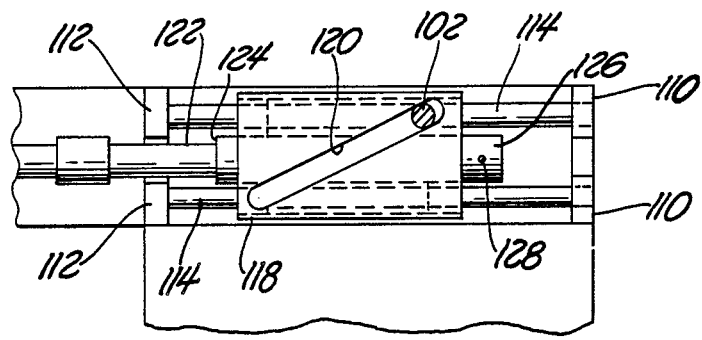
FIG. 3 is a view taken along line 3—3 in FIG. 4.

Referring to FIGS. 2, 3 and 4, a frame 106 is detachably fixed, typically by bolts, to a bracket 108, which is fixed in the same fashion to transmission housing cover 11. Frame 106 has two pairs of legs 110 and 112 and has a U-shaped receptacle 116 open toward the veiwer in FIG. 2. Rails 114 run between pairs of legs 110 and 112 to slideably support a cursor 118 translating between the pairs of legs. As seen in FIG. 3 cursor 118 has a diagonal groove 120 to receive detent pin 102. Groove 120 is oriented obliquely not only to the longitudinal axis of rails 114 but also to the translational axis of rack 88, whereby movement of cursor 118 translates rack 88. Preferably, for convenience in calibrating our shifter mechanism, cursor 118 has a set of suitably labelled graduated marks on its side, each mark corresponding to one of the ranges (reverse, neutral, unlock, drive) of the transmission. The appropriate mark aligns with an indicator arrow 134 on the frame 106 to show what range the transmission is in. Passing through cursor 118 is a push-pull cable 122 secured to cursor 118 by annular collar 124 and cable end 126, as best seen in FIG. 3.

Cable end 126 is fastened to cable 124 by a conventional quick-release pin 128, which may be provided with a pull ring (not shown) for convenience in removal of pin 128. The sheath 130 (FIG. 2) of push-pull cable 122 has nuts 132 threaded thereon on either side of U-shaped receptacle 116, so that loosening one of the nuts permits the cable 122 to be quickly removed from the receptacle. Nuts 132 can also be rotated to adjust the position of 122 to the left or right as seen in FIG. 2. Pushing or pulling motion on the cable is transferred to cursor 118, then rack 88, drive shaft 84, cam shaft 68, and then selected sliding blocks 64. As described earlier, the positions of sliding blocks 64 determine what solenoid assemblies will be mechanically actuated, thereby controlling the automatic transmission. The push-pull cable is actuated by a lever inside the vehicle which pivots to positions corresponding to the drive, neutral, reverse or unlock ranges of the shifter mechanism, each position of the lever being appropriately labelled for the convenience of the vehicle operator.

We wish it to be understood that we do not desire to be limited to the exact details of construction shown and described since obvious modifications may occur to those persons skilled in the art without departing from the scope of the following claims.

We claim:

1. For an automatic transmission normally operated by solenoids, an apparatus for mechanically shifting the automatic transmission, comprising:
   a mounting block on the transmission;
   a cam shaft rotatably secured to the mounting block, the cam shaft having a plurality of lobes;
   blocks defining apertures surrounding the cam shaft having camming surfaces engageable by the lobes of the cam shaft, whereby the sliding blocks translate when the lobes rotate past the respective camming surfaces;
   the lobes being on lines along the cam shaft, the lobes on each line disposed at selected axial locations whereby a selected subset of the sliding blocks translate when the cam shaft rotates to a selected angular position;
   solenoid assemblies on the transmission;
   a linkage means connected between the solenoid assemblies and the individual sliding blocks for translating the armatures of the solenoid assemblies;
   a gear train means for rotating the cam shaft to a selected rotational position, whereby selected solenoid assemblies on the transmission are actuated.

2. The apparatus of claim 1 including a means for placing the apparatus into an unlock mode wherein the apparatus is disabled from shifting the transmission;

3. The apparatus of claim 1 wherein the gear train includes feedback means for sending a palpable signal upon entry of the apparatus into an unlock, neutral, drive or reverse mode.

4. The apparatus of claim 1 wherein the gear train means comprises:
   a drive shaft for rotating the cam shaft;
   a translatable rack for rotating the drive shaft;
   a secondary housing on the transmission housing for receiving the rack, the secondary housing defining an elongate slot parallel to the axis of the secondary housing;
   a member translatable within the secondary housing and connected to the rack, the member having a projection extending therefrom through the slot in the secondary housing;
   a frame on the transmission housing having a slide rail perpendicular to the longitudinal axis of the rack;
   a cursor body slideable on the rail defining a groove for receiving the projection of the translatable member, the groove being disposed obliquely to the the slide rail, whereby translation of the cursor block along the rail moves the translatable member in the secondary housing;

5. In a vehicle having an automatic transmission normally operated by means of solenoids responding to signals from the transmission shift selector of the vehicle, an apparatus for mechanically shifting the automatic transmission in the absence of electrical power to the automatic transmission, the apparatus comprising:
   a mounting block fixed to the housing of the automatic transmission, the mounting block having a pair of opposed walls;
   a cam shaft rotatably secured at each end to the opposed walls of the mounting block, the cam shaft having a plurality of lobes thereon;
   a plurality of blocks disposed between the opposed walls of the mounting block shaft, the blocks defining apertures through which extends the cam shaft, the apertures having camming surfaces engageable by the lobes of the cam shaft, whereby the sliding blocks are translated laterally away from the axis of the cam shaft when the lobes are rotated past the respective camming surfaces;
   the lobes being disposed along one of a discrete number of lines on the cam shaft parallel to the longitudinal axis thereof, the lobes on each line being disposed at selected axial intervals so that only selected ones of the sliding blocks are translated when the cam shaft is rotated to a selected angular position;
   a plurality of solenoid assemblies protruding from the housing of the automatic transmission;
   a linkage means mounted to each solenoid for mechanically translating the plunger of the solenoid assemblies;
   a plurality of cables, one cable connected between each linkage means and a corresponding sliding block so that lateral translation of any sliding block actuates the associated linkage means;
   a means for biasing the armatures of solenoid towards their de-energized positions and biasing the sliding blocks toward the axis of the cam shaft;
   a shift selector means mechanically linked to the cam shaft for rotating the cam shaft to a selected rotational position, whereby selected solenoids on the automatic transmission are mechanically actuated.

6. The apparatus of claim 5 wherein the portion of the solenoid assembly extending from the automatic transmission housing is a generally cylindrical canister, the linkage means of the apparatus further comprising:
   a pin fixed to the solenoid armature and protruding from one end of the canister, the pin translatable to one position upon de-energization of the solenoid assembly and translatable to a retracted position upon energization of the solenoid assembly;
   a collar circumscribing the canister having a pair of arms extending away from the canister and defining a secondary aperature disposed radially between the canister and the pair of arms;
   a dowel passing through the secondary aperture;

a lever pivotally mounted between the arms of the collar, one end of the lever fastened to the cable leading to the sliding block and the other end of the lever engaged with the dowel, whereby pivoting of the lever translates the dowel in the secondary aperture of the collar;

an arm mounted at one end to the dowel and having another end defining a slot for engaging the pin protruding from the center.

7. The apparatus of claim 5 further comprising:

a drive shaft for rotating the cam shaft extending through the the mounting block perpendicular to the cam shaft;

a translatable toothed rack passing through the mounting block for rotating the drive shaft;

a generally cylindrical housing fixed to the transmission housing disposed concentrically with the longitudinal axis of the toothed rack, the cyindrical housing defining an elongate slot parallel to the axis of the housing;

a piston-like member translatable within the cylindrical housing and connected to the toothed rack, the piston-like member having a camming projection extending therefrom through the slot in the cylindrical housing;

a frame fixed to the transmission housing having a pair of parallel slide rails fastened thereto perpendicular to the axis of the cylindrical body;

a cursor body slideable on the rails defining groove for receiving the camming projection of the piston-like member, the groove being disposed obliquely to the the slide rails, whereby translation of the cursor block along the rails translates the piston-like body in the cylindrical housing;

a means for translating the cursor block in response to movement of a control lever manipulated by the operator of the vehicle.

8. The apparatus of claim 5 wherein the lobes are press fit onto the camshaft.

9. The apparatus of claim 5 wherein the lobes are ball bearings silver soldered into hemispherical concavities defined by the camshaft.

* * * * *